Figure 2:
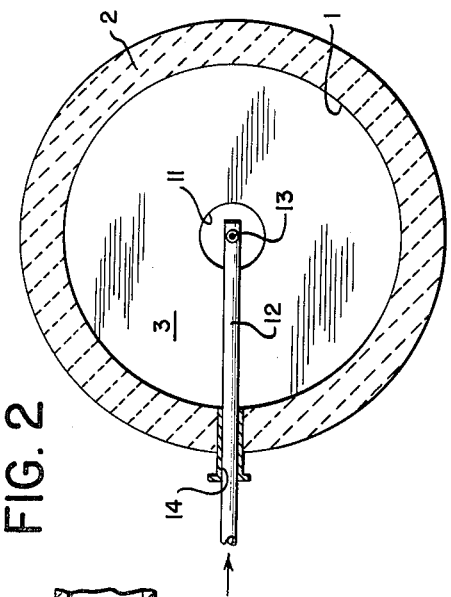

May 31, 1966  C. L. DE LAND ETAL  3,253,890

MANUFACTURE OF CARBON BLACK

Filed July 5, 1962

INVENTORS
CHARLES L. DeLAND
GEORGE L. DeCUIR
LOUIS E. WIGGINS
BY
*Pennie, Edmonds, Morton Barrows Taylor*
ATTORNEYS

United States Patent Office 3,253,890
Patented May 31, 1966

3,253,890
MANUFACTURE OF CARBON BLACK
Charles Lamar De Land, George L. De Cuir, and Louis E. Wiggins, West Monroe, La., assignors to Columbian Carbon Company, New York, N.Y., a corporation of Delaware
Filed July 5, 1962, Ser. No. 207,494
14 Claims. (Cl. 23—209.6)

This invention relates to the manufacture of furnace carbon blacks by the incomplete combustion and thermal decomposition of hydrocarbons and provides new and highly useful and effective methods for producing, from hydrocarbons which are normally liquid or readily fusible solids, carbon blacks possessing unique structural, sorbtive and electrically conductive properties.

The characteristic of carbon black known as "structure" is well-known in the industry. The condition is observable through electron microscope examination as a linking together of the carbon particles to form reticulated or interlaced chains and may be determined by other well-known methods. Carbon blacks in which this characteristic is highly developed are known as "high structure" carbon blacks.

The extent of structure developement in a carbon black is, for instance, reflected, and more conveniently appraised, by means of the oil absorption properties of the black, as determined by the conventional Stiff Paste Oil Absorption Test and expressed in gallons of oil absorbed by 100 pounds of black. It is known that for comparable particle size, there is a definite relationship between oil absorption and the extent of structure development, the higher the oil absorption value, the greater the structure development.

Another way of expressing the extent of structure development of carbon blacks is by "Structure Index," which is a correlation between the oil absorption value and the mean particle size of the carbon black. By this system, a carbon black which has been shown to have normal structure for its established mean particle size is arbitrarily assigned a structure index of 100. At any given fineness level, carbon blacks possessing structure other than normal will have a structure index proportionately higher or lower than 100. For example, assuming that a carbon black having a structure index of 100 shows an oil absorption of 10 gallons of oil per 100 pounds of the black, another carbon black of equivalent fineness having an oil absorption of 20 will have a structure index of 200. Carbon blacks having a structure index in excess of 100 are normally designated "high structure carbons."

A more detailed description of carbon black structure and structure index will be found in a paper entitled, "The Carbon Spectrum for the Rubber Compounder," appearing in Rubber Age (New York), volume 55, No. 5, for August 1944.

Various processes have been developed for making high structure carbon blacks from highly aromatic, normally liquid hydrocarbons or readily fusible solids, and also by thermally decomposing hydrocarbon vapors in a furnace, but the extent of structure developement in carbon blacks so produced has heretofore been considerably limited. Rarely has the carbon black so produced had oil absorption characteristics in excess of 24 gallons per 100 pounds of the black or a structure index in excess of 300. It is an object of our present invention to produce carbon blacks having extraordinarily highly developed structure, as indicated by oil absorption characteristics and structure index of a much higher order.

For some purposes, carbon blacks having high structure characteristics are undesirable. However, for other purposes, for instance in the manufacture of dry cell electric batteries of the Le Clanche type, the use of blacks having exceptionally high structure development is considered essential.

High structure blacks especially adapted for use in the manufacture of such dry cells have, for some years, been produced from acetylene or ethylene by well-known methods. But such endothermic gases do not afford practical adaptability to prevalent carbon black manufacturing methods.

In recent years, the industry has striven to develop a process whereby a carbon black embodying structure characteristics approximating those of acetylene blacks could be produced from the more conventional charging stocks of the carbon black industry. Though some progress has been made in this direction, as evidenced by Heller's U.S. Patent No. 2,779,665, the desired goal has not heretofore been attained.

It is, therefore, a further object of our invention to provide a process whereby carbon blacks possessing, in combination, structural, sorbtive and electrically conductive properties equivalent to or superior to those of the conventional acetylene black, and having oil absorption values raging upwardly from about 35 gallons per 100 pounds, can be produced from raw materials readily available from the petroleum or coal processing industries as liquids or easily melted solids, such as currently used in the manufacture of rubber-grade carbon blacks.

In accordance with our present invention, we can produce from the normally liquid or readily liquefied solid or semisolid hydrocarbons, of the type currently used in the manufacture of rubber-grade carbon blacks, carbon blacks having oil absorption characteristics well in excess of 24 and a structure index well over 300. For example, using as the charging stock a hydrocarbon oil having a high aromatic content, we have produced carbon blacks having an oil absorption of 59.8 and a structure index of 740. Also, in accordance with our present invention, using as charging stock a hydrocarbon having a high content of paraffinic and naphthenic compounds, we have produced carbon blacks having an oil absorption of 30.8 and a structure index of 437.

The invention by which these amazing results are obtained is predicated on our discovery that in producing furnace carbon blacks from charging stocks of the type conventionally used in the production of rubber-grade carbon blacks, i.e., normally liquid or readily liquefied solid or semisolid hydrocarbons, the structure development of the resultant carbon black can be surprisingly increased by injecting the hydrocarbon into a relatively quiescent, preheated furnace chamber as a finely-atomized spray of liquid droplets and quickly mixing with the spray as it enters the furnace chamber a free oxygen-containing gas, in a proportion adequate to support only partial combustion of the hydrocarbon, and which is substantially free from products of combustion or partially burned or pyrolyzed hydrocarbons, and thereby subjecting the hydrocarbon so introduced to a rapid partial burning so as to form an intense, localized flame within the furnace chamber, and thereafter subjecting the products of the flame, including the partially burned or partially pyrolyzed hydrocarbons, to a thermal decomposition. These two operations may be carried out in rapid succession in the same furnace chamber, but special precaution should be taken to maintain the atomospheric conditions within the furnace chamber relatively quiescent and to avoid any substantial mixing of products of combustion or partially burned or pyrolyzed hydrocarbons, or other reducing gases, either from within the furnace chamber or from any extraneous source, with the free oxygen-containing gas or with the entering spray stream prior to the partial combustion reaction of the free oxygen thereof with the hydrocarbons of the spray stream.

For optimum results, the subsequent thermal decomposition of the products of the flame should also be carried out under relatively quiescent conditions in order to permit the development of the carbon black structure to an even more extraordinary extent. Turbulence should be minimized both in the region of the localized flame and in the zone of thermal decomposition of the products of the flame.

By this process, the structure, and other characteristics of the carbon black can be regulated and controlled over a substantial range, as hereinafter described, by regulating and controlling the relative amount of free oxygen-containing gas initially mixed with the hydrocarbon spray.

The air, or other free oxygen-containing gas, introduced into the furnace chamber should not be permitted to react with any hydrocarbon or other combustible prior to being mixed with the entering carbon-forming spray stream. The air and spray stream should be so introduced into the furnace chamber that they merge and react in a relatively localized region of the chamber and so that a thorough, straight-way mixing of the two reactants is accomplished and the mixture ignited to form an intensely burning, self-sustaining localized flame.

Advantageously, the stream of air, or other free oxygen-containing gas, is caused to flow around and in contact with the atomized spray at a velocity relatively low compared with that of the entering hydrocarbon spray so that the air is rapidly drawn into, and thoroughly mixed with, the spray stream as the latter emerges from the spray nozzle.

It will be understood that the carbon formation is not accomplished entirely within the flame, but usually sufficient heat is liberated by the flame to thermally decompose the partially decomposed hydrocarbons into carbon black within another portion of the furnace chamber. In accordance with the process of our invention, the carbon black-forming reaction appears to be initiated within the localized flame.

The invention also provides means for exercising other important operational techniques which are advantageously used in various combinations in making these high structure blacks in accordance with our present process, as will appear from the following further description thereof.

Though not restricted thereto, the process of our present invention has, with advantage, been carried out in a vertically elongated furnace chamber of circular, or substantially circular, cross-section, of the general type described and illustrated, for instance, in the Heller U.S. Patent 2,779,665, by injecting the hydrocarbon in liquid form vertically upwardly and coaxially into the preheated furnace chamber as a spray of finely-divided liquid droplets and introducing a stream of the oxygen-containing gas, advantageously air, coaxially upwardly around and in contact with the spray stream so that the air is rapidly drawn into and quickly mixed with the oil droplets as the spray stream enters the furnace chamber, with the exclusion of the products of partial burning or partial pyrolysis of hydrocarbons, or other products of combustion or gases of a reducing nature from any extraneous source prior to said mixing. The amount of oxygen so mixed with the spray stream is sufficient to support only partial combustion of the hydrocarbons and form an intensely burning localized flame. The products of the flame then pass upwardly through the elongated furnace chamber, through a zone thereof maintained at a carbon forming temperature, and are there subjected to further thermal decomposition, all under relatively quiescent conditions.

Other than the hydrocarbon spray stream, and atomizing gas which may be used to effect the atomization, and the coaxial air stream, no further combustible or combustion-supporting gases should be introduced into those zones of the furnace chamber just described, though it is permissible, and sometimes desirable, to subject the resultant gaseous suspension of carbon black passing from the elongated furnace chamber to further treatment which may involve the mixing of hot products of combustion therewith.

While we cannot with certainty explain the chemical reactions or mechanism by which this surprising increase in structure is obtained, we have established that when any substantial amount of products of partial burning or of the pyrolysis of hydrocarbons or other products of combustion or gases of a reducing nature is present in the air, or other free oxygen-containing gas, at the point of mixing of the air with the oil spray, or is drawn into or mixed with the oil spray as it enters the furnace chamber, prior to the mixing with the air, the surprising increase in structure development is not obtained.

The process of this invention will be further illustrated with reference to the accompanying drawings which represent a vertically elongated furnace, of the general type disclosed in the above-mentioned Patent 2,779,665, but modified to adapt it to our present process. As previously noted, it will be understood that through the further illustrations of our process are specifically related to that aspect thereof carried out in a furnace such as illustrated in the drawings, the invention in its broader aspect is not so restricted.

Figure 3:
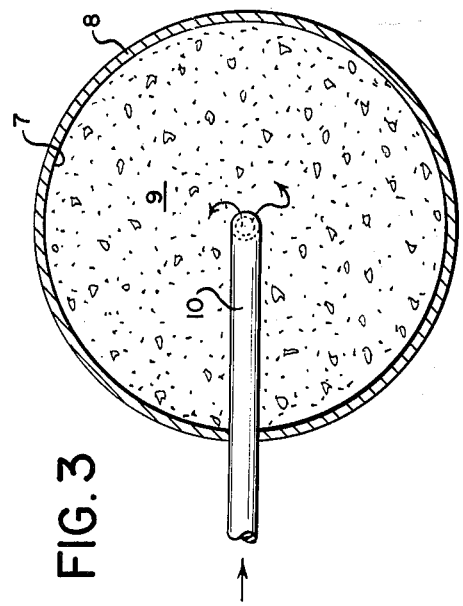
Figure 1:
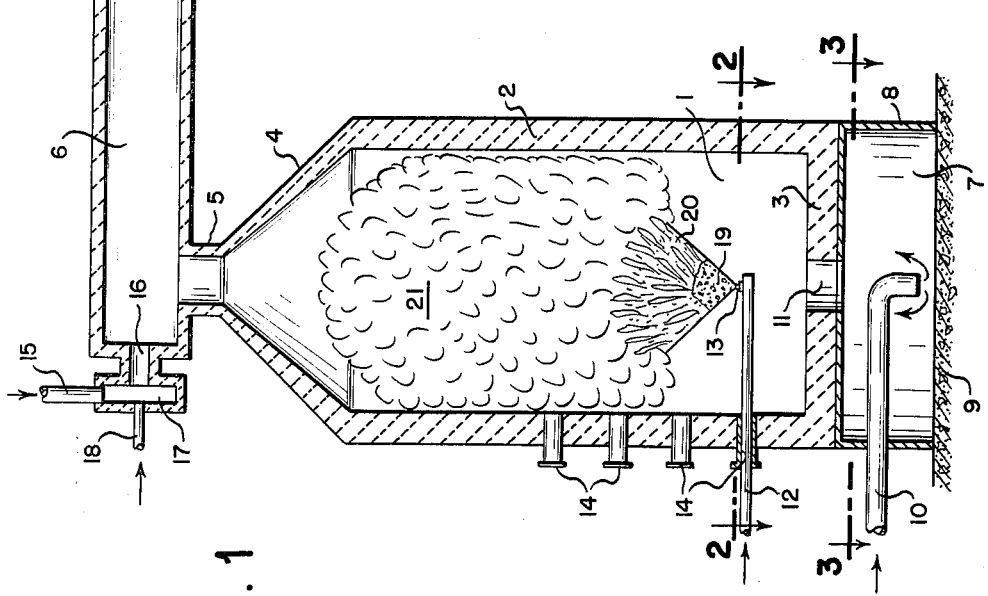

In the drawings,

FIG. 1 is a somewhat diagrammatic, vertical section of the furnace taken through the center line of the furnace chamber, FIG. 2 is a horizontal section along the line 2—2 of FIG. 1, and FIG. 3 is a horizontal section along the line 3—3 of FIG. 1.

In a type of apparatus represented by the drawings the conversion of the hydrocarbon to carbon black is effected in the cylindrical vertically-elongated furnace chamber represented at 1 which is enclosed by a cylindrical wall 2, a floor 3 and a conically-shaped room 4, all of which are constructed from suitable refractory material. The carbon black suspended in the furnace effluent gases passes from the upper end of chamber 1 by way of vent 5 and out through breeching 6 to a conventional carbon black separation system, not shown.

Beneath the floor 3 of furnace chamber 1, there is situated a cylindrical chamber 7 which is delineated by the furnace chamber floor 3, cylindrical metal side wall 8 and a concrete floor 9, the latter also serving as a support platform for the furnace structure.

A free oxygen-containing gas, air for instance, is introduced into chamber 7 through a metal conduit 10 and flows upwardly from chamber 7 into chamber 1 through a circular-shaped, coaxially-positioned duct 11 extending through the furnace chamber floor 3.

Liquid hydrocarbons are introduced into the chamber through conduit 12 and are atomized upwardly into the chamber as a fine spray of liquid droplets by means of an atomizer indicated at 13. The atomizer may be of the single-fluid type, but a two-fluid type atomizer may be employed wherein a pressurized vapor or gas is used as an auxiliary means for effecting proper atomization.

Both of these types of atomizers are well-known in this art and need not here be further described.

To facilitate the regulation of mixing of the oxygen-containing gas with the spray of hydrocarbon droplets, we have provided means for varying the distance between the atomizer 13 and the air duct 11. A series of openings 14 in the furnace wall 2 allows conduit 12 and atomizer 13 to be positioned at various heights above the air duct 11. After the atomizer has been inserted and secured within any particular opening 14, the remaining openings are capped off.

As previously noted, the effluent from chamber 1 passed through vent 5 into and through the breeching 6. In passing through the breeching, the carbon black in suspension may be after-treated by introducing an oxygen-containing gas into the furnace effluent gases so as to generate heat by partial combustion, or hot gaseous products of combustion, generated without the duct, may be mixed with the furnace effluent gases passing through breeching 6.

By the first-mentioned procedure, the oxygen-containing gas, air for instance, may be introduced through conduit 15 to chamber 17 and thence through duct 16 into the breeching. Where preformed hot combustion gases are used for the after-treatment, they may be formed by burning in chamber 17 a fuel from some extraneous source, introduced through conduit 18 with air introduced through conduit 15.

The wall 2 of the furnace chamber and the chamber roof 4 should be thermally insulated exteriorly and may, in turn, be covered with a metal shell.

In carrying out our improved process in apparatus of the type just described, it is necessary to preheat the reaction chamber 1, the breeching 6 and the carbon collecting equipment to proper operating temperatures, well understood in this art. This is conveniently accomplished by burning a fuel such as natural gas within the furnace chamber 1 and passing the resultant hot gases through breeching 6 and the carbon separating system. This preheating may be accomplished by charging fuel gas to the furnace chamber through conduit 12 and atomizer 13 while passing air upwardly into the furnace chamber, as previously described.

Once the proper operating temperature has been reached, the fuel gas is shut off and, in lieu thereof, the liquid hydrocarbon is charged to the furnace chamber through conduit 12 and the proportion of air and position of atomizer 13 adjusted to produce a carbon black of the desired properties.

Where a normally solid or semisolid hydrocarbon residue or tar is used, it should be heated to a readily flowable and atomizable liquid before attempting to introduce it into the furnace chamber. Even where a normally liquid hydrocarbon is used, it is frequently advantageous to preheat it before passing it to the furnace chamber.

As it enters the furnace chamber, the hydrocarbon liquid is converted by nozzle 13 to a spray of fine droplets so that a thorough, straight-way mixing of the air and the hydrocarbon is effectively accomplished. Although single-fluid atomizers have been successfully employed for this purpose, we presently prefer to use a two-fluid type atomizer wherein a secondary fluid, such as steam or air, is used as an aid to the atomization. This atomizing fluid will, of course, be passed to the atomizer 13 under pressure, in accordance with conventional procedure, and will issue from the orifice of the atomizer tip along with the hydrocarbon forming a cone-shaped pattern of hydrocarbon droplets 19 passing at considerable velocity upwardly into chamber 1.

While thus spraying the hydrocarbon into a furnace chamber, a continuous, regulated supply of the free oxygen-containing gas, advantageously air, is passed upwardly into the furnace chamber through duct 11 and passes upwardly around and in contact with the hydrocarbon spray stream, the upwardly flowing current of air being relatively free from turbulence.

Turbulence of the air stream is minimized by directing it downwardly into the lower chamber 7 against the floor 9, whereupon it diffuses uniformly and essentially perpendicularly before rising through duct 11 into chamber 1. The cross-sectional area of duct 11 should be so proportioned with respect to other furnace dimensions that the air passing upwardly through the duct issues therefrom into the chamber 1 as a gently upwardly flowing stream directed toward the atomizer 13.

By thus introducing the air and the hydrocarbon spray upwardly along the vertical axis of the chamber, and by reason of the more rapid upward movement of the liquid droplets constituting the spray, the air is rapidly drawn directly into the tip of the spray cone and the air and hydrocarbon rapidly and thoroughly mixed without excessive turbulence occurring in the mixing or reaction regions and a rapid, yet relatively tranquil, localized partial combustion reaction of the hydrocarbon and the oxygen is quickly effected. The surrounding sheath of air also aids in shielding the entering spray stream from other gases present in the furnace chamber.

As previously noted, the initial velocity of the entering spray stream should substantially exceed the velocity of the air current, and for optimum results the initial velocity of the atomized droplets should exceed about 100 feet per second.

The velocity of the entering stream of air will, of course, depend on the cross-sectional area of the duct 11 and the volume of air required. The velocity ratio of the entering spray stream and the air current is subject to considerable variation depending upon the desired extent of structure development. We have, with advantage, so proportioned the cross-sectional area of duct 11, with respect to the volume of air to be admitted, that the velocity of the entering air stream falls within the range from about 1.5 feet to about 15 feet per second.

One method provided by our present invention for regulating and controlling structure development by varying the proportion of air mixed with the entering spray stream is by varying the height of nozzle 13 above duct 11. When the entering velocity of the air is in the lower end of the above-noted range, the spray nozzle 13 will usually be placed nearer to the duct 8 so that the air is more readily inspired into the spray before the air stream can diverge over too great a portion of the furnace chamber cross-section, or become contaminated by the furnace chamber atmosphere, before being mixed with the spray droplets. Where the air velocity is greater, there is less tendency for divergence and the spray nozzle may be raised further from the air duct.

Where the partial burning of the hydrocarbon of the spray stream is relied upon to supply the heat needed for the complete conversion of the remaining hydrocarbon to carbon black, one must, of course, so adjust the ratio of air to oil to effect sufficient combustion for that purpose. On the other hand, it will be recognized that increased combustion reduces yield. Therefore, for optimum results, one must so adjust the supply of air as to obtain the required heat generation and adjust the height of the spray nozzle above the inlet air duct so as to obtain the required flame condition and to obtain the desired structure development under such conditions. These adjustments may be readily made by simple tests.

We have found that where air is used as the free oxygen-containing gas, in a furnace of the type illustrated in the drawings, the proportion of air used should generally fall within the range from about 50 to about 1000 standard cubic feet per gallon of hydrocarbon. Especially advantageous results have been obtained using from about 250 to about 650 standard cubic feet of air per gallon of hydrocarbon.

Within these limits, we have found that increasing the proportion of air results in increased structure development, as indicated by oil absorption values, and reduction in particle size of the resultant carbon black, as indicated by tinting strength. This is illustrated by the following tabulation showing oil absorption and tinting strength values of carbon blacks produced from the blended oils used in Example II in a furnace of the type shown in the drawings, using various proportions of air to oil, as indicated.

| Std. Cubic Feet of Air per Gallon of Hydrocarbon | Carbon Black Test Values | |
| --- | --- | --- |
| | Oil Absorption, Gals./100 lbs. | Tinting Strength, Percent Fine Furnace Black |
| 250 | 36 | 24 |
| 300 | 37.5 | 28 |
| 350 | 40 | 32 |
| 400 | 43 | 42 |
| 450 | 48 | 54 |
| 500 | 56 | 63 |
| 550 | 59.5 | 68 |
| 600 | 59.8 | 70 |

As both the air and the spray of hydrocarbon droplets are projected upwardly, as previously described, they mix and burn, while flowing concurrently, with a minimum of turbulence to form the flame 20. The hydrocarbons not consumed by the burning issue from the flame as upwardly rising vapors and vaporizing liquid droplets. They rise well up into chamber 1, being conveyed by the velocity imparted to the liquid hydrocarbons by the spraying operation. This momentum is soon lost, however, and as the vapors and droplets are sufficiently heavy, they fall back through the chamber, wherein they decompose while passing through the lighter and upwardly rising products formed during combustion and thermal decomposition of the hydrocarbons. Vaporization of the hydrocarbon droplets occurs rapidly, as the temperature within the chamber above the flame is well above the boiling point of the hydrocarbon, and is maintained sufficiently high, in fact to thermally decompose the hydrocarbon vapors into carbon black while they rise and fall in chamber 1.

Before the hydrocarbon vapors can fall to the chamber floor 3, their transformation into carbon black is completed. The carbon formed is of a very light and flocculent nature, and it is readily entrained by the upwardly rising gases formed during hydrocarbon combustion and decomposition, and carried out of chamber 1 through vent 5 into breeching 6. As the carbon and lighter gases rise, the heavier hydrocarbon vapors fall through them, with the result that carbon structure is even further developed by the thermal decomposition of hydrocarbon vapors upon and within the carbon already formed.

As a result of this phenomena, there is formed within chamber 1, in the space above flame 20, a non-turbulent smoke cloud or "blanket" 21. It is important to the operation that the "blanket" 21 be maintained at a distance above the tip of the atomizer 13 which allows flame 20 to develop without becoming mixed with the constituents of the "blanket." This requires that the "blanket" be floated with its lower boundary at a height above the atomizer tip which permits flaming of the hydrocarbon droplets to proceed below the folds of the "blanket," without utilizing an upward velocity in the chamber which causes the hydrocarbon vapor to pass directly out vent 5 before it can fall downward and thermally decompose within the chamber 1. By using the conventional arrangement of a throttling damper and a suction fan in the carbon separation system, the internal pressure of chamber 1 and the flow of constituents through it can be precisely regulated. If the chamber is maintained under a very slight vacuum, the bottom of the "blanket" can be held at a distance above the atomizer tip 13 which allows the oxygen and hydrocarbon to mix and form the flame 20, before contact with the constituents of "blanket" 21 occurs. If the constituents of the blanket are allowed to commingle with the free oxygen-containing gas or with the liquid spray mixture before combustion of the latter occurs, the development of carbon black structure is detrimentally affected.

To further enhance structure, we retard turbulence within the "blanket" as much as possible, and we therefore restrict the flow of the constituents through the chamber in order to maintain a low velocity within it. Our operations have been particularly successful when we have maintained the quantity of constituents introduced into chamber 1 within limits which assure that the gas velocity through the chamber is within the range from about one-half foot to about five feet per second.

The formation of the carbon is, of course, influenced by the temperature maintained within the furnace chamber 1. If temperatures are too low, thermal decomposition of the hydrocarbon is incomplete, so that considerable coking of the furnace occurs, and the carbon black formed will have an excessive amount of incompletely decomposed hydrocarbon adsorbed upon its surface. When temperatures are too high the hydrocarbon decomposes at an excessive rate and coalescence of the vapors into long chainlike configurations is impaired. We have found that the temperature within the furnace chamber 1 should be maintained between about 1100° F. and about 2500° F., but especially advantageous results are obtained when the furnace temperature is maintained within the range from about 1600° F. to about 2300° F.

For making highly structured carbon blacks by this process, it is usually desirable to use a hydrocarbon feed stock which is aromatic in nature, i.e., one comprising at least 50% aromatics, by weight and we prefer a feed stock having a high content of polynuclear aromatic compounds. Normally solid materials such as naphthalene and anthracene may be used, but we have successfully utilized highly aromatic oils derived from petroleum and coal.

Although carbon black structure can be most readily developed using feed stocks which have a comparatively high content of aromatic compounds, we have been able to make unusually highly structured carbons from petroleum oils which contain a high percentage of saturated hydrocarbons, such as paraffins and naphthenes. But, by using oil containing a higher percentage of aromatic compounds, we have been able to make carbon blacks having even greater structural development, and such feed stocks which have been employed successfully in this process include creosote oils derived from coal and residue oils derived from the catalytic cracking of petroleum.

As we have previously noted herein, before injecting the liquid hydrocarbon feed stock into the furnace chamber, we find particular advantage in preheating the liquid to temperatures which are well over its melting point. We have found, in our process, that both structural development and particle fineness of the carbon can be increased by preheating the hydrocarbon feed stock before it is atomized. For example, in an operation such as previously described, using as feed stock the blend of aromatic oils used in Example II, by preheating the feed stock to the progressive higher temperatures indicated before it was sprayed into the furnace, the following oil absorption and tinting strength values were obtained, these values being respectively an index of structural development and particle fineness as previously noted.

| Oil Preheat Temperature, ° F. | Oil Absorption, Gals./100 Lbs. | Tinting Strength, Percent FF Std. |
| --- | --- | --- |
| 220 | 41.0 | 34 |
| 300 | 46.0 | 44 |
| 400 | 53.0 | 55 |
| 500 | 58.0 | 66 |

Thus, by raising the temperature of the hydrocarbon before spraying it into the furnace chamber, we considerably enhance the formation of carbon blacks having exceptionally high structural development with respect to their fineness.

The carbon black thus formed in suspension in the furnace gases is carried from chamber 1 in suspension through duct 5 and breeching 6, which leads to separating apparatus which may be of conventional design.

Under some operating conditions, the furnace black passing from chamber 1 may contain small amounts of incompletely decomposed hydrocarbons adsorbed on its surface, which, for some purposes, is undesirable, especially where a higher purity or electrically conductive carbon is required. This incompletely decomposed adsorbed hydrocarbon, when present, may be readily eliminated from the carbon black by subjecting the black to an aftertreatment as it passes from the furnace chamber through breeching 6, as we have previously described.

By such aftertreatment, remaining traces of hydrocarbons may be eliminated or the surface area of the carbon black increased, or both. This aftertreatment may be effected either by mixing a free oxygen-containing gas, such as air, with the hot suspension passing through breeching 6, so as to generate additional heat by combustion, or by mixing preformed hot gaseous products of combustion with the suspension.

Where air alone is used, conbustible gaseous constituents of the furnace effluent gases are burned to liberate sufficient heat to decompose to carbon black any residual hydrocarbons adsorbed on the black. This procedure may result in a decrease in yield by the burning of some of the carbon black, if high proportions of air are so introduced. The decreased yield may be avoided in the apparatus shown by injecting air tangentially into chamber 17 through conduit 15 while injecting a hydrocarbon fuel, for instance natural gas, into chamber 17 through conduit 18 wherein they are rapidly mixed and the resultant products of combustion are passed through duct 16 into breeching 6 and there mixed with the hot carbon black suspension.

A further advantage of the latter procedure is that, by regulating the proportion of air to hydrocarbon fuel, it is possible to produce either an oxidizing or a neutral or a reducing stream of hot blast flame gases for mixing with the carbon black suspension whereby the surface chemistry of the resultant carbon black can be influenced.

Where it is desired further to increase the surface area of the carbon black, this may be accomplished by mixing the free oxygen-containing gas with the carbon black suspension in breeching 6, as previously described, but using proportions of oxygen in excess of that required where it is desired merely to eliminate incompletely decomposed hydrocarbons from the surface of the carbon black. By creating this more severe oxidizing condition, the surfaces of the carbon black particles are pitted by oxidation and surface area thus increased.

The invention will be further illustrated and its effectiveness demonstrated by the following specific examples of several applications thereof. But it will be understood that these examples are by way of illustration and are not intended to be limitative.

*Example I*

This operation was carried out in apparatus of the type shown in the drawings, the inner diameter of the furnace chamber being 6.5 feet and its height 8.5 feet in the cylindrical section. The circular air duct in the furnace floor was 22 inches in diameter and the atomizer tip was positioned 6 inches directly above the air duct.

The hydrocarbon charging stock was a No. 6 fuel oil having a refractive index of 1.571, a specific gravity of 0.9779, an A.P.I. gravity of 13.2 and a mean molecular weight of 450. Its saturated hydrocarbon content was 42% by weight and its aromatic hydrocarbon content was 48% by weight. Its SSU viscosity at 100° F. was 6753, at 130° F. was 1829 and at 210° F. was 156. This oil was distillable to the extent of 84%, leaving a residue of 16%. Its distillation analysis was as follows:

|  | ° F. |
|---|---|
| IBP | 570 |
| 5% over at | 640 |
| 10% over at | 675 |
| 20% over at | 700 |
| 30% over at | 712 |
| 40% over at | 724 |
| 50% over at | 728 |
| 60% over at | 731 |
| 70% over at | 736 |
| 80% over at | 738 |
| End point | 770 |

Air was used as the free oxygen-containing gas and was introduced into the furnace chamber at a rate of 30,000 s.c.f.h. while the hydrocarbon was sprayed upwardly into the furnace chamber, as shown, at the rate of 54 gallons per hour. Saturated steam, under a pressure of 25 pounds per square inch, was used as the secondary atomizing fluid. The atomizer comprised a single spray nozzle and was of the type known as "6-B," marketed by Spray Engineering Company. Prior to passing the hydrocarbon into the furnace chamber, it was preheated to 210° F. and the furnace chamber was maintained at a temperature between 1900° and 2100° F.

The carbon black so produced was after treated in the breeching by mixing with the carbon black suspension hot blast flame gases formed by burning air and natural gas at a rate of 20,000 s.c.f.h. and 2500 s.c.f.h., respectively.

In this operation, there was obtained 2.96 pounds of carbon black per gallon of oil charged to the furnace chamber and the resultant carbon black was found on test to have a tinting strength of 40% that of a standard FF (Fine Furnace) carbon black, oil absorption of 30.8 gallons per 100 pounds, and an iodine absorption of 41 and its structure index was found to be 437. This black was further found to be substantially free of surface adsorbed hydrocarbons.

*Example II*

In this operation, a furnace similar to that of Example I was used, but somewhat larger, the cylindrical section of the furnace chamber being 8.5 feet in diameter and 15 feet in height, the air duct in the floor of the chamber being 22 inches in diameter. The atomizer was located 31 inches above the air duct and the blanket was maintained approximately 11 inches above the atomizer tip.

The charging stock used was a blend of 75 parts creosote oil derived from coal and 25 parts highly aromatic petroleum oil derived through catalytic cracking of petroleum. The respective oils possess the characteristics set forth in the following tabulation:

| Oil | API Gravity | Index of Refraction | Molecular Wt. | Cont. of Aromatic Comps., Percent by Wt. | UOP K Factor | BMCI | Sp. Gr. | Mean Avg. B.P., °F. |
|---|---|---|---|---|---|---|---|---|
| Petroleum | 3.0 | 1.6325 | 270 | 82 | 10.1 | 114 | 1.052 | 740 |
| Creosote | 3.2 | 1.662 | 155 | 99 | 8.99 | 156 | 1.102 | 510 |

Air was introduced into the chamber at a rate of 64,000 s.c.f.h. and the hydrocarbon charging stock was sprayed into the chamber at a rate of 108 gallons per hour, using saturated steam at 75 pounds per square inch pressure as the secondary atomizing fluid. The atomizer was of the same type as that used in the preceding examples. Prior to introducing the hydrocarbon into the furnace chamber, it was preheated to 440° F. and the furnace chamber was maintained at a temperature between 1890 and 2000° F. The resultant carbon black was aftertreated in the breeching, as previously described, by mixing air therewith at a rate of 10,000 s.c.f.h.

By this operation, 3.3 pounds of carbon black per gallon of charging stock were produced and the black was found to have a tinting strength 72% that of standard FF carbon black and an oil adsorption of 53.2 gallons of oil per 100 pounds of the black, a structure index of 627 and an iodine absorption of 78. Its volatile content other than moisture was 1.52% by weight and the black was found to be substantially free of surface adsorbed hydrocarbons.

*Example III*

In this operation, the furnace of the preceding Example II was used and the feed stock was the petroleum oil of Example II, unblended with the creosote oil. The atomizer tip was of the type used in Example I and was located 31 inches above the air duct in the chamber floor. The blanket was maintained approximately 11 inches above the atomizer tip. Air was introduced into the furnace chamber at a rate of 60,000 s.c.f.h. and the hydrocarbon feed stock was atomized into the furnace chamber at a rate of 120 gallons per hour, using as the secondary atomizing fluid steam at a pressure of 75 pounds per square inch. Before being introduced into the furnace chamber, the hydrocarbon feed stock was preheated to a temperature of 480° F. and the furnace chamber was maintained at a temperature between 1700° and 1850° F. The carbon black was aftertreated in the breeching, as in the preceding example, by mixing air with the carbon black suspension at the rate of 14,000 s.c.f.h.

In this run, 3.5 pounds of carbon black were obtained per gallon of hydrocarbon feed stock. The resultant carbon black was found to have a tinting strength 59% that of standard FF carbon black, an oil absorption of 59.8 gallons per 100 ponuds of the black, a structure index of 740 and an iodine adsorption of 60. Its volatile content other than moisture was 1.26% by weight and it was found to be substantially free of surface adsorbed hydrocarbons.

From the foregoing examples, it will be seen that the carbon blacks produced in accordance with our present invention, from raw materials of the type conventionally used in the manufacture of rubber-grade carbon blacks, have extraordinarily high-structure development. They also inherently possess high sorbtive capacity and high electrical conductivity. Very frequently, the size of the particle composing the reticulated chains are unusually small in proportion to the chain length, yet it is significant that these chains are so well formed that they strongly resist breakage. While carbon black structure is damaged to some extent by the attrition force exerted by various forms of processing equipment, the carbon blacks made by the process of our present invention, retain their structure and other properties quite well when subjected to rather severe shearing effects such as encountered in packing, mixing and milling operations. These same carbon blacks contain a very low content of impurities, detectable as volatile substances other than moisture, and the absence of such materials adds greatly to their electrical conductivity.

These high structure carbon blacks may be used with particular advantage in the production of Le Clanche type dry cell batteries, as previously noted, being incorporated into the depolarizing bobbin to impart a high electrolyte absorptive capacity to the "black mix" and a lasting electrical conductivity between the cell electrodes.

However, our improved carbon blacks have other important uses. For instance, they may be used to impart specific characteristics to other compositions, e.g., elastomers. When incorporated into elastomers, they impart to the cured elastomer composition a high modulus of elasticity and considerably lower its electrical resistivity. They have also been compounded with wood pulp to form black paper having comparatively high electrical conductivity.

When compounded with rubber, carbon blacks, produced in accordance with our present invention, impart to the rubber a modulus of elasticity substantially in excess of that imparted to the rubber by the conventional high structure acetylene black. This is illustrated by a comparison of the product of the foregoing Example II with acetylene black, the respective blacks being incorporated by identical procedure into rubber compositions of identical formula, and the resultant compositions cured and tested by comparable procedure. In these tests, the rubber formula was as follows:

| | Parts by weight |
|---|---|
| Baled crepe natural rubber | 100.0 |
| Carbon black | 50.0 |
| Stearic acid | 3.0 |
| Zinc oxide | 5.0 |
| Benzothiazyl disulfide | 0.6 |
| Sulfur | 2.5 |

The resultant compositions, when cured at a temperature of 293° F. for the indicated time periods, were found to possess the following characteristics:

| | Cure Time, Min. | Carbon Black of Example II | Acetylene Black |
|---|---|---|---|
| Modulus, L-300 | 10 | 1,785 | 1,600 |
| | 15 | 1,970 | 1,830 |
| | 30 | 2,200 | 2,060 |
| | 45 | 2,370 | 2,135 |
| Tensile | 10 | 3,055 | 3,160 |
| | 15 | 3,475 | 3,535 |
| | 30 | 3,800 | 3,635 |
| | 45 | 3,835 | 3,460 |
| Elongation | 10 | 495 | 505 |
| | 15 | 485 | 510 |
| | 30 | 500 | 490 |
| | 45 | 480 | 460 |
| Hardness | 10 | 61 | 62 |
| | 15 | 64 | 64 |
| | 30 | 68 | 68 |
| | 45 | 69 | 69 |
| Percent Rebound | | 70.7 | 73.5 |
| Log R | | 1.7 | 2.0 |

The acetylene black used in the foregoing tests had an oil absorption value of 40.3 gallons per 100 pounds of black, a tinting strength 66% that of standard FF black and an iodine adsorption of 74. It is noteworthy that such acetylene blacks are well-recognized for their high structural development and also for the high modulus of elasticity and high electrical conductivity which they impart to rubber compositions. Yet, as shown by the foregoing tabulation, the carbon black produced in accordance with our present invention imparted even a higher modulus, a higher tensile strength at optimum cure and higher electrical conductivity to the rubber composition than did the acetylene black.

We claim:

1. A process for producing, from normally non-gaseous hydrocarbons, carbon blacks having exceptionally high structure, sorptive and electrical conductivty characteristics which comprises:
   (a) injecting the hydrocarbons upwardly into the lower end of a preheated, vertically elongated furnace chamber as an atomized spray of liquid droplets;
   (b) introducing into said lower end of the furnace chamber around and in contact with said spray stream a relatively quiescent current of a free oxygen-containing gas that is substantially free of gases of a reducing nature, products of combustion and products of pyrolysis of hydrocarbons, in a proportion sufficient to maintain only partial combustion of said hydrocarbons, so as to surround the spray of droplets with a rising single column of free oxygen-containing gas of substantial cross-section a mixture of said hydrocarbon spray and said free oxygen-containing gas is formed in a localized region of said lower end of the furnace chamber;

(c) subjecting said hydrocarbon spray to a partial burning with the oxygen-containing gas mixed therewith to form an intense localized flame while maintaining the atmosphere within the furnace chamber relatively quiescent;

(d) thereafter passing the products emanating from the flame upwardly through a zone of said elongated furnace chamber maintained at carbon forming temperature, thereby subjecting said products to thermal decomposition to carbon black, whereby any substantial amount of reducing gases, products of combustion and products of pyrolysis of hydrocarbons, from whatever source, are excluded from contact with the mixture of hydrocarbon and free oxygen-containing gas formed within said column prior to initiation of combustion, so as to permit a substantial improvement in the structural, sorptive and electrical induction properties of the resultant carbon black.

2. The process of claim 1 in which the hydrocarbon spray is injected upwardly into the furnace chamber at a velocity exceeding that of the free oxygen-containing gas introduced upwardly around and in contact with said spray stream so that the free oxygen-containing gas is rapidly drawn into and quickly mixed with the oil droplets as the hydrocarbon spray stream enters the furnace chamber.

3. The process of claim 2 in which the free oxygen-containing gas is air.

4. The process of claim 1 in which the free oxygen-containing gas is air.

5. The process of claim 3 in which the velocity of the upwardly rising air current is within the range from about 1.5 feet to about 15 feet per second and the initial velocity of the entering spray exceeds 100 feet per second.

6. The process of claim 1 in which the free oxygen-containing gas is air and is introduced into the furnace chamber in an amount equivalent to from about 250 to about 650 standard cubic feet per gallon of the hydrocarbon.

7. The process of claim 1 in which the furnace temperature is maintained within the range from about 1600° to about 2300° F.

8. The process of claim 1 in which the hydrocarbon is preheated to a temperature of from about 220° to about 500° F. before being atomized into the furnace chamber.

9. The process of claim 2 in which the thermal decomposition of the products emanating from the flame is effected in the quiescent upper portion of the furnace chamber, thereby forming a smoke blanket, the lower boundary of which is maintained well above the point of entry of the hydrocarbon spray.

10. The process of claim 2 in which the effluent from the furnace is subjected to an aftertreatment by which the carbon black suspension is further heated for eliminating residual hydrocarbon from the surface of the carbon black particles.

11. The process of claim 1 in which the hydrocarbon is one comprising at least 50% of aromatics, by weight.

12. The process of claim 11 in which the aromatic hydrocarbons include a substantial proportion of polynuclear aromatic compounds.

13. The process of claim 2 in which the characteristics of the carbon black are regulated and controlled by regulating and controlling the proportion of free oxygen-containing gas inspired into the spray stream.

14. The process of claim 9 in which the upward velocity of the suspension forming the smoke blanket is maintained within the range from about one-half foot to about five feet per second.

References Cited by the Examiner

UNITED STATES PATENTS

| | | | |
|---|---|---|---|
| 1,945,907 | 2/1934 | Kroner | 23—209.9 |
| 2,643,182 | 6/1953 | Williams | 23—209.6 |
| 2,714,055 | 6/1955 | Cines et al. | 23—209.4 |
| 2,779,664 | 1/1957 | Sweitzer | 23—209.4 |
| 2,779,665 | 1/1957 | Heller | 23—209.8 |

BENJAMIN HENKIN, *Primary Examiner.*

MAURICE A. BRINDISI, *Examiner.*

A. J. STEWART, E. J. MEROS, *Assistant Examiners.*